(12) United States Patent
Cherifi et al.

(10) Patent No.: US 8,973,071 B2
(45) Date of Patent: Mar. 3, 2015

(54) REMOTE ACCESS TO A MEDIA DEVICE

(75) Inventors: Tanya D. Cherifi, Tampa, FL (US); Rajesh Sharma, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1443 days.

(21) Appl. No.: 12/644,776

(22) Filed: Dec. 22, 2009

(65) Prior Publication Data

US 2011/0154418 A1 Jun. 23, 2011

(51) Int. Cl.
| | |
|---|---|
| H04N 7/173 | (2011.01) |
| H04N 21/472 | (2011.01) |
| H04N 5/782 | (2006.01) |
| H04N 21/4227 | (2011.01) |
| H04N 21/433 | (2011.01) |
| H04N 21/61 | (2011.01) |
| G10L 15/26 | (2006.01) |

(52) U.S. Cl.
CPC ......... H04N 21/47214 (2013.01); H04N 5/782 (2013.01); H04N 7/173 (2013.01); H04N 21/4227 (2013.01); H04N 21/4334 (2013.01); H04N 21/6187 (2013.01); G10L 15/26 (2013.01)

USPC ............................ 725/106; 725/116; 709/219

(58) Field of Classification Search
CPC ....................... H04N 7/17309; H04L 12/2801
USPC ............................ 725/86–118; 709/217–232
See application file for complete search history.

(56) References Cited

U.S. PATENT DOCUMENTS

| | | | | |
|---|---|---|---|---|
| 6,405,170 | B1 * | 6/2002 | Phillips et al. | 704/270 |
| 6,459,774 | B1 * | 10/2002 | Ball et al. | 379/67.1 |
| 6,937,986 | B2 * | 8/2005 | Denenberg et al. | 704/275 |
| 7,209,964 | B2 * | 4/2007 | Dugan et al. | 709/223 |
| 7,306,560 | B2 * | 12/2007 | Iliff | 600/300 |
| 7,340,043 | B2 * | 3/2008 | Crockett et al. | 379/88.17 |
| 7,366,285 | B2 * | 4/2008 | Parolkar et al. | 379/88.17 |
| 7,798,417 | B2 * | 9/2010 | Snyder et al. | 235/494 |
| 8,019,057 | B2 * | 9/2011 | Sharma | 379/88.22 |
| 8,023,636 | B2 * | 9/2011 | Koehler et al. | 379/265.05 |
| 8,326,624 | B2 * | 12/2012 | Jaiswal | 704/246 |
| 2007/0203708 | A1 * | 8/2007 | Polcyn et al. | 704/270.1 |
| 2009/0156171 | A1 * | 6/2009 | Yasrebi et al. | 455/412.2 |

* cited by examiner

Primary Examiner — Annan Shang

(57) ABSTRACT

A voice telephone call may be received, from a telephony device, in a server configured to provide interactive voice response. A spoken command may be received from the telephony device. In the server, the spoken command may be converted to a format appropriate for the media storage unit. The converted command may be sent from the server to the media storage unit.

25 Claims, 3 Drawing Sheets

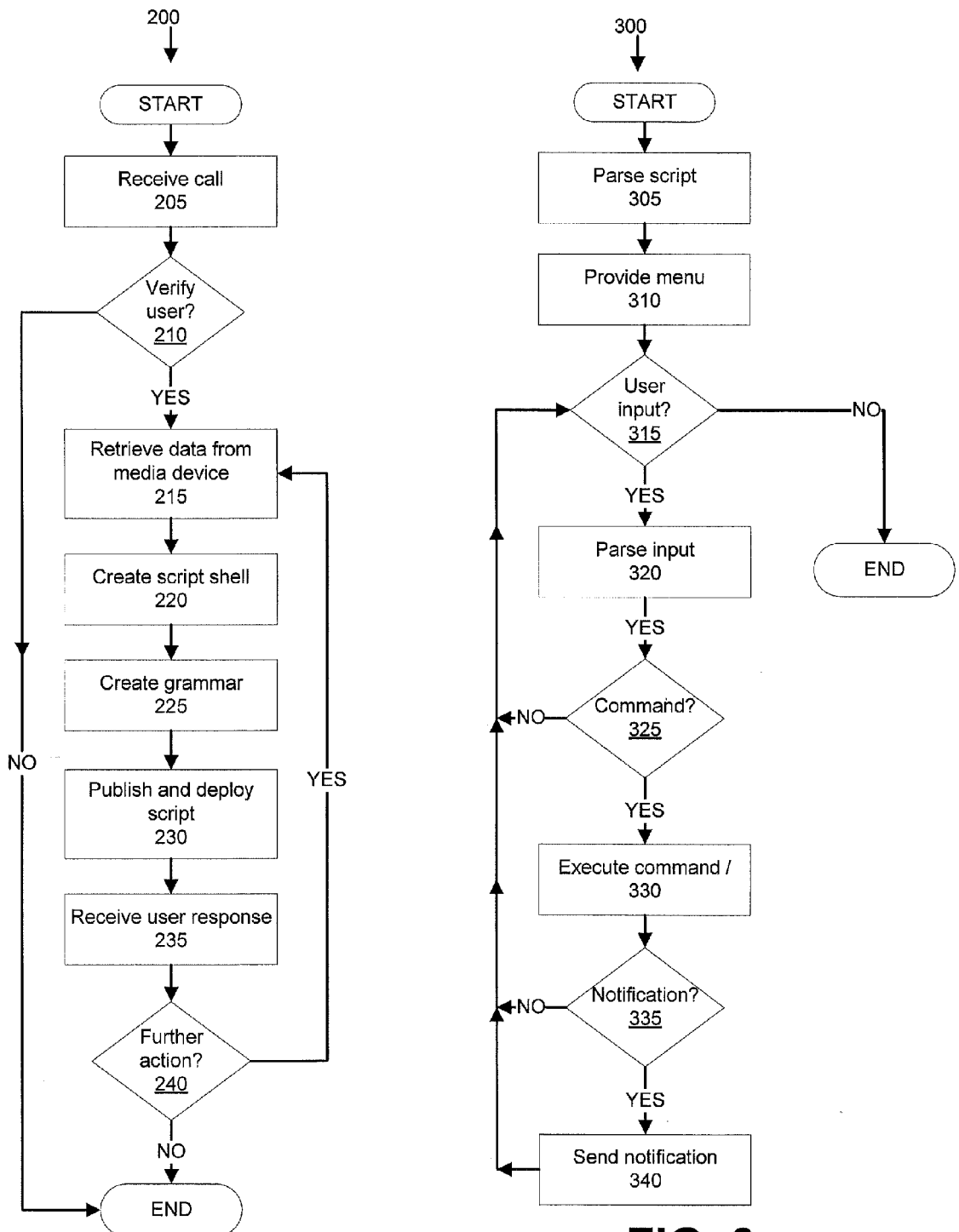

REMOTE ACCESS TO A MEDIA DEVICE

BACKGROUND INFORMATION

Users of media storage units, such as digital video recorders, may wish to monitor and modify programs scheduled to be recorded, and programs stored, in the media storage unit. Mechanisms exist for such monitoring and modifying when the user has direct physical access to the media storage unit. However, a user may also wish to monitor and modify programs or other information stored on the media storage unit when a user has access only to a telephone.

BRIEF DESCRIPTION OF THE DRAWINGS

FIG. 2 illustrates an exemplary process for an interactive voice response server to handle a call from a telephone.

FIG. 3 illustrates an exemplary process for a user to interact with a media device and/or media storage unit through an interactive voice response server.

DETAILED DESCRIPTION OF PREFERRED EMBODIMENTS

Figure 1:
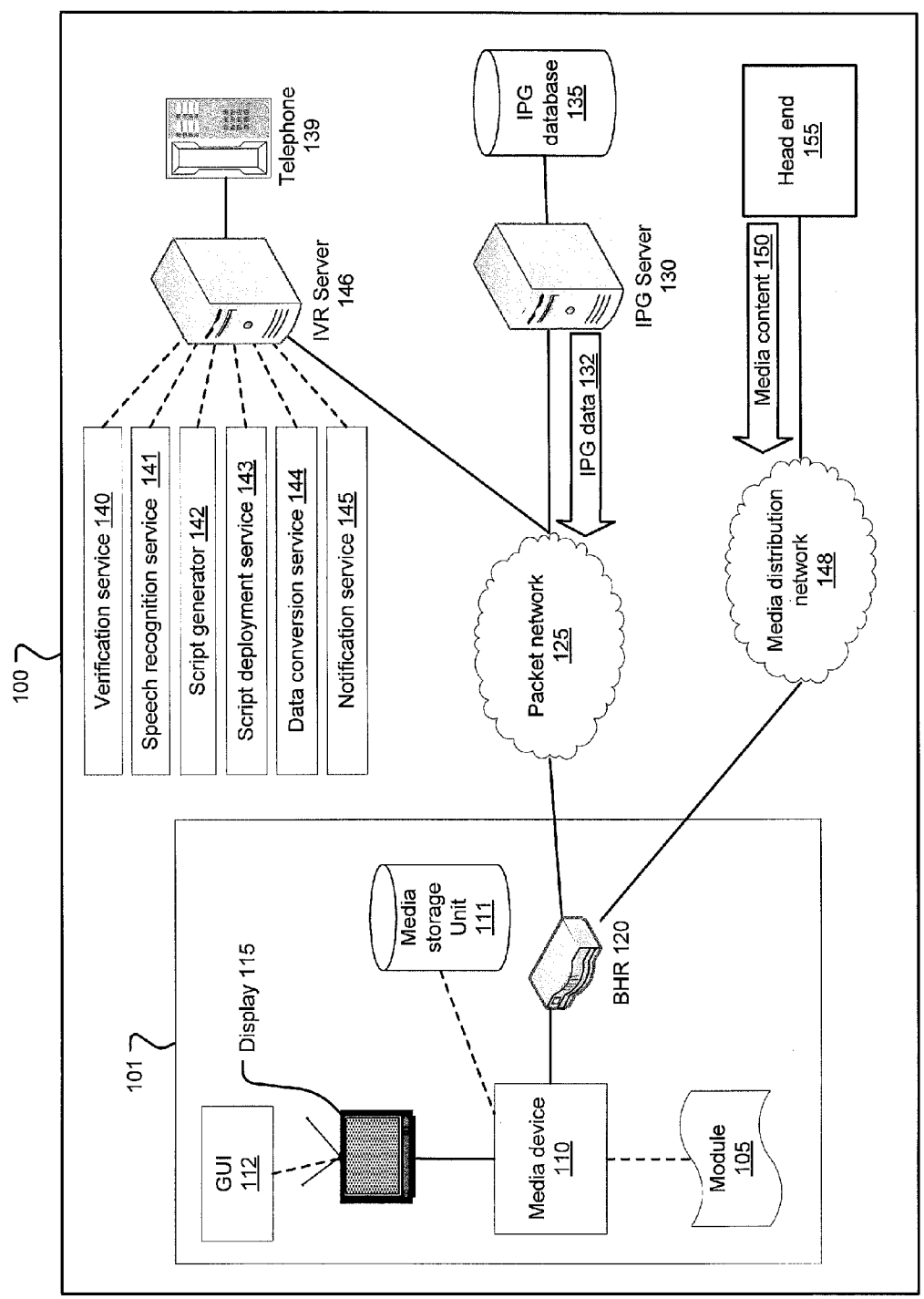
FIG. 1 illustrates an exemplary system for storing and processing media content.

FIG. 1 illustrates an exemplary system 100 for storing and processing media content. A customer premises 101 includes a media device 110, which may be controlled by a user through a control such as a remote control or the like, to view video on a video display 115. Media device 110 may be a set top box (STB) or similar device configured for receiving media content via a packet network 125 and/or a media signal, e.g., a video signal, that includes media content 150 from a media distribution network 148. The device 110 may then be used to provide media content to a media display device 115, e.g., through a graphical user interface (GUI) 112. Further, media device 110 is generally communicatively coupled with a media storage unit 111; the storage unit 111 may, but need not, be included within the media device 110. An example of a media device 110 is a set top box (STB) and an example of storage unit 111 is a digital video recorder (DVR).

An interactive voice response (IVR) server 146 may communicate with the media device 110 and/or media storage unit 111 via the packet network 125. The IVR server 146 is generally configured to provide audio prompts, menus, or other mechanism for providing inputs to a user of a telephone 139. Operation of the IVR server 146 is supported by various modules, including a verification service 140, a speech recognition service 141, a script generator 142, a script deployment service 143, a data conversion service 144, a notification service 145, and other modules and/or instructions for carrying out processes including steps described herein. These modules may all include computer-executable instructions stored on a computer-readable medium within, or accessible by, IVR server 146.

IVR server 146 may provide for download, or may provide updates for, a module 105 included in, or accessible to, media device 110. Further, the module 105 could be pre-included in the device 110, or pre-stored in storage unit 111. In any event, the module 105 generally includes computer-executable instructions that are stored in a memory of the media device 110, and that may be executed by a processor included within media device 110. Instructions in module 105 may include instructions for displaying content, e.g., content stored in media storage unit 111, in a graphical user interface (GUI) 112 included in display 115, sometimes according to input provided by a user through a remote control or the like.

Media display 115 may be a television receiver, including a conventional television or a high definition television (HDTV).

Media device 110 generally includes a processor and a memory, as well as a computer readable medium, such as a disk or the like, for storing data and computer-executable instructions, e.g., module 105. Media device 110 selectively communicates, via a broadband home router (BHR) 120, with a packet switched network 125 and/or a video distribution network 148.

GUI 112 allows viewers of display 115 to obtain information and to select media content for display on display 115, generally by navigating and making selections using a remote control device or the like. For example, GUI 112 could be used to display lists of content stored in storage unit 111 and/or menus or the like for accessing and managing media data stored in storage unit 111. Often, storage unit 111 may be used to store media data such as media content 150 received via a media distribution network 148, or media downloaded via packet network 125. Thus, GUI 112 may be used to display menus, or other mechanisms for providing inputs, to allow a user to provide commands to media device 110 and/or media storage unit 111 for capturing and storing media data. For example, a user could provide a command to store media content 150 received in a particular program channel and a particular time period. Similarly, a user could provide a command to delete previously recorded media data from unit 111. Further, a user could access media storage unit 111, e.g., via menus or the like provided through GUI 112, to select media data to be provided via display 115.

An interactive program guide (IPG) server 130 also selectively communicates with router 120, generally via network 125. IPG server 130 generally includes a processor and a memory, as well as a computer readable medium such as a disk or the like for storing data, e.g., IPG data 132, and computer executable-instructions, where the data 132 may be downloaded to media device 110. For example, IPG server 130 provides IPG data 132 to media device 110 to provide an interactive program guide graphical user interface in GUI 112. Accordingly, IPG data 132 may be downloaded to media device 110 and then updated on a regular basis. For example, data 132 may be updated periodically, or as warranted, e.g., when available content 150 changes, or new content 150 becomes available. Further, IPG data 132 may be used by media device 110 to populate menus or other structures in GUI 112 to allow a user to select programming for storage in media storage unit 111.

An IPG database 135 may be included within IPG server 130, or may be part of a separate computing system. In any event, IPG server 130 is generally configured to selectively retrieve information from IPG database 135 in response to requests for IPG data 132. IPG data 132 includes data concerning channels of media content, e.g., video content available to media device 110.

A media distribution network 148 is a network for providing media content 150, e.g., a video signal. For example, network 148 may include hardware and software for providing a video signal via coaxial cable and/or fiber optic cable. Further, media content 150 may be provided to the video distribution network 148 as a video signal from a head end 155.

One or more video hub offices (not pictured), sometimes referred to as "VHOs," may serve as a point of aggregation and distribution for media content. For example, a video signal, e.g., a video signal encoded as a Motion Picture Experts Group-2 (MPEG 2) stream, may be provided from a head end through a media distribution network 148 to a video hub office. Accordingly, IPG server 130 may be located in a VHO. Further, IPG server 130 or some other server in the VHO may receive media content 150 from the media distribution network 148, e.g., one or more video signals, and may combine such media data 150 with IPG data 132 for delivery to media device 110.

Packet switched network 125 is generally an internet protocol (IP) network. As such, network 125 uses protocols for transporting data, such as user datagram protocol (UDP), transport control protocol (TCP), hypertext transfer protocol (HTTP), etc. Further, network 125 may include a variety of networks such as a wide area network (WAN), e.g., the Internet, a local area network (LAN), etc. Packet switched network 125 may be used to transport a variety of data, including multimedia data such as audio and video. Accordingly, it is to be understood that networks 125 and 148 may in fact be combined into a single network, or that video distribution network 148 may simply be omitted, whereby packet switched network 125 is used to provide video signal 150 to media device 110, possibly through a video hub office as discussed above.

BHR 120 distributes audio, video, and data to devices within customer premises 101, such as media device 110. For example, BHR 120 may be a broadband home router or wireless broadband home router from Actiontec Electronics, Inc. of Sunnyvale, Calif.

IVR server 146 generally includes a processor and a memory, as well as a computer readable medium such as a disk or the like for storing data and computer executable-instructions, e.g., verification service 140, speech recognition service 141, script generator 142, and/or a script deployment service 143. One or more telephones 139 may access the IVR server 146 in a variety of manners; telephone 139 may be any of a variety of telephony devices capable of making a call to IVR server 146. For example, telephone 139 may be connected to central office in a circuit-switched network such as the public switched telephone network (PSTN) or plain old telephone service (POTS), and may communicate with IVR server 146 via a gateway device. However, although not explicitly depicted in FIG. 1, telephone 139 could be, e.g., a Voice over Internet Protocol (VoIP) or the like that accesses IVR server 146 via packet network 125.

As mentioned above, verification service 140, speech recognition service 141, script generator 142, script deployment service 143, and/or data conversion service 144, and notification service 145 are modules that may be used to support operations of IVR server 146.

Verification service 140 generally operates to confirm the identity of a user of telephone 139 accessing IVR server 146. For example, when IVR server 146 receives a call from telephone 139, verification service 140 could be configured to accept a user entry, e.g., using a dual tone multi-frequency (DTMF) dialing, of a password, personal identification number (PIN), or the like. The verification service 140 may then check the entered password or PIN against a database or data store included in or accessible by IVR server 146 that includes records of user passwords or PINs. Alternatively or additionally, verification service 140 could perform a biometric identification of a user of telephone 139. For example, verification service 140 could be configured to check a voiceprint of the user against a database or data store of voice prints included in or accessible by IVR server 146.

Speech recognition service 141 may include instructions for parsing audio input from a user of a telephone 139, and determining whether the input matches a command, menu item, or other response that IVR server 146 is configured to receive.

Script generator 142 generates a script that may be used by IVR server 146 for providing prompts to, and identifying possible inputs from, a user of telephone 139. For example, a script may be formatted according to a standard according to extensible markup language (XML) such as VoiceXML (VXML). An exemplary VXML file is reproduced in the Appendix. A specification for VoiceXML, fully incorporated by reference herein in its entirety, is provided by the World Wide Web Consortium (W3C), and at the time of filing of this application may be found at http://www.w3.org/TR/voicexml21/. VoiceXML includes mechanisms for specifying user prompts, e.g., "Say the name of the media program you would like to record," and for collecting responses to such prompts, which responses may be parsed by speech recognition service 141. Further, VoiceXML includes mechanisms for submitting information obtained from users to a server such as IVR server 146.

Script generator 142 further generally includes instructions for creating a grammar that may be used in the script. A grammar may be a computer file that includes a list of possible inputs in response to a prompt. For example, a VoiceXML file could specify a prompt such as "Say the name of the media program you would like to record." A grammar referenced in the VoiceXML file could then include a list of media programs that the user could select. Similarly, a grammar could include a list of one or more possible commands, e.g., to record a program at a particular date and time, to delete a program from storage unit 111, etc. Further examples of possible commands are provided in the sample VXML file reproduced in the Appendix.

Script deployment service 143 deploys scripts generated by script generator 142 to IVR server 146. In general, a script, e.g., a VXML file, is deployed to IVR server as needed to supply prompts for user input, and to provide a framework, generally including a grammar, for receiving responses to prompts.

Data conversion service 144 may be included in script generator 142, or may be provided separately. In any event, data conversion service 144 converts data received from media storage unit 111 into a format appropriate for a script that may be used by IVR server 146, e.g., VXML.

Notification service 145 provides notifications of changes made to media storage unit 111 resulting from calls to IVR server 146. For example, notifications may be made via e-mail messages, simple message service (SMS) messages, automated telephone calls, etc. Accordingly, notification service 145 may include an e-mail client, and SMS client, etc. for providing notifications. Notifications may include information such as a confirmation that a program has been deleted from media storage unit 111, that a program has been scheduled to be recorded, etc.

Computing devices such as media device 110, IPG server 130, etc. may employ any of a number of computer operating systems, including, but by no means limited to, versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices, including, without limitation, a computer workstation, a desktop, notebook, laptop, or handheld computer, or some other computing device.

Media device 110 generally is a specialized device for receiving media content, e.g., video signals, from head end 155 via network 148, e.g., via a VHO, and may be provided with a proprietary or specialized operating system other than those enumerated above. For example, media device 110 may be an STB provided with a real time operating system (RTOS) or the like. Further, media storage unit 111 may be a digital video recorder (DVR) or the like. However, it is to be understood that media device 110 and/or media storage unit 111 may be one or more computing devices such as one of those enumerated above, so long as the computing device or devices are capable of receiving media content 150 from network 148, storing and managing media data, e.g., recording media data according to user-programmed instructions, playing back media content in response to a user request, etc., and in general storing and executing the instructions included in module 105.

Computing devices such as media device 110, IPG server 130, widget data server 135, etc., generally each include instructions executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners. A file system may be accessible from a computer operating system, and may include files stored in various formats. An RDBMS generally employs Structured Query Language (SQL) in addition to a language for creating, storing, editing, and executing stored procedures, such as the PL/SQL language mentioned above.

FIG. 2 illustrates an exemplary process 200 for IVR server 146 to handle a call from a telephone 139.

Process 200 begins in a step 205 in which IVR server 146 receives a call from telephone 139. As noted above, this call could be made through a variety of media and using a variety of different mechanisms.

Next, in step 210, IVR server 146 attempts to verify a user of the telephone 139, e.g., using mechanisms such as discussed above. If IVR server 146 is unable to verify an identity of the user as an individual to whom access to the IVR server 146 should be given, then the process 200 may end following step 210. However, if the IVR server 146 is able to match information relating to the user, e.g., a voiceprint, a PIN, etc., to information stored in or accessible to IVR server 146, the information indicating that the identified user should be given access, then step 215 is executed next. As part of the verification performed in step 210, IVR server 146 generally associates the user with a particular customer premises 101, which in turn may be associated with network addresses or the like to allow IVR server 146 to send data to, and receive data from, media device 110 and media storage unit 111.

In step 215, IVR server 146, e.g., via packet network 125, retrieves data from a media device 110 and/or media storage unit 111 associated with the user identified in step 210. For example, IVR server 146 could communicate with widget 105 stored in media device 110 to retrieve, from media storage unit 111, metadata relating to media data stored in storage unit 111, e.g., names of programs, times when programs were recorded, stored instructions to download and/or record and save future programming, etc. Such data may be in a binary or other format requiring conversion to some other format, such as an XML format, by data conversion service 144. Further, data provided from media storage unit 111 and media device 110 could be in some XML format, and then converted to VXML by data conversion service 144.

Next, in step 220, script generator 142 creates a shell for a script such as a VoiceXML file to facilitate user interaction with media device 110 and/or storage unit 111. The shell created in step 220 generally sets forth various data elements that may be played to the user. The Appendix provides exemplary VXML, including exemplary data elements.

Next, in step 225, script generator 142 generates a grammar that is then used to populate the script shell generated as described above in step 220. The exemplary VXML file included in the Appendix illustrates an implementation of a grammar between "<grammar>" and "</grammar>" tags.

Next, in step 230, the script generated in steps 220 and 225 is deployed, e.g., to IVR server 146. For example, script deployment service 143 may execute the script by playing prompts to a user of telephone 139.

Next, in step 235, IVR server 146 may receive responses to prompts provided in a script, e.g., by a user of telephone 139 speaking a command such as "I want to change a program" or "I want to know how much recording time is left." User interactions such as may occur in steps 230 and 235 are described in more detail with respect to FIGS. 3 and 4 below.

Next, in step 240, IVR server 146 determines whether further action is required. For example, if a user of telephone 139 has hung up, or spoken a command indicating that the user is finished providing instructions related to media storage unit 111, then no further action is required. However, a user may have provided a command indicating that the user should be prompted for further input, such as "I want to change a program." In that event, further action is required. If further action is not required, process 200 ends. Otherwise, process 200 returns to step 215.

Process 200 may return to step 215 (and hence the steps following step 215) one or more times during execution of process 200. For example, a first time step 215 is executed, script generator 142 may generate a script according to which IVR server 146 will play an audio file including the prompt "Please state a command." Then when, step 235 is executed, IVR server 146 might receive a command such as "change a program." Following step 240, process 200 would then return to step 215, in which script generator 142 which generate a new script according to which, e.g., IVR server 146 might play a prompt including an audio file including a list of programs, or a prompt to "state in the name of a program to change," etc.

FIG. 3 illustrates an exemplary process 300 for a user to interact with media device 110 and/or media storage unit 111 through IVR server 146. Process 300 assumes that a user of telephone 139 has already placed a call to IVR server 146, and that the script has been published and deployed to IVR server 146 as described above with respect to step 230 of process 200.

Accordingly, the process 300 begins in a step 305, in which IVR server 146 parses the script generated as described above with respect to FIG. 2. Parsing the script allows IVR server 146 to play appropriate audio files prompting a user of telephone 139 to state commands, queries, etc.

Following step 305, in step 310, IVR server 146 plays one or more audio files, according to the script parsed in step 305, to provide a menu of options to the user of telephone 139. For example, IVR server 146 may play one or more audio files including statements such as: "Please state one of the following: I want to know how much recording time is left; I want to add a program; I want to delete a program; I want to change some other setting."

In step 315, which may follow any of steps 310, 325, 335, and 340, IVR server 146 determines whether input has been received from a user. If input has not been received within a predetermined time, e.g., 10 seconds, process 300 may end. Although not illustrated in FIG. 3, IVR server 146 will generally re-prompt a user for input if none has been received within a predetermined time up to a predetermined number of re-prompts, e.g., three. If and when an input is received from a user of telephone 139, process 300 proceeds to step 320.

In step 320, IVR server 146 uses speech recognition service 141 to parse input received from the user in step 315. Parsing input received from the user generally means identifying a word or words spoken by the user, or determining that spoken input from the user cannot be identified as any word or words in a provided grammar.

In step 325, which follows step 320, IVR server 146 determines whether the input parsed in step 320 is a recognizable command to be performed with respect to media storage unit 111. If not, process 300 returns to step 315. Although not illustrated in FIG. 3, if speech recognition service 141 is unable to recognize the received input, IVR server 146 may play a prompt such as "Please state that command again" and return to step 315. Further, process 300 could be terminated following step 325 if non-parsable input has been received a predetermined number of times, e.g., three. If the input parsed in step 320 is a recognizable command, then step 330 is executed following step 325.

In step 330, the command identified in step 325 is executed. A process for executing, and returning results from, commands as described in more detail below with respect to FIG. 4.

Next, in step 335, IVR server 146 determines whether a notification should be provided concerning the execution of the command in step 330. For example, a user of telephone 139 could be associated with a user profile or other records indicating a user's preferences to receive notifications, e.g., an address to which notifications should be sent, commands for which notifications should be provided (or whether notifications should be provided for all commands), etc. If a notification should be sent, step 340 is executed next. Otherwise, process 300 returns to step 315.

In step 340, the notification is sent. For example, notification service 145 could provide an e-mail, an SMS message, etc., as described above. An exemplary notification might state "The program [insert program name] has been deleted." Following step 340, process 300 returns to step 315.

Figure 4:
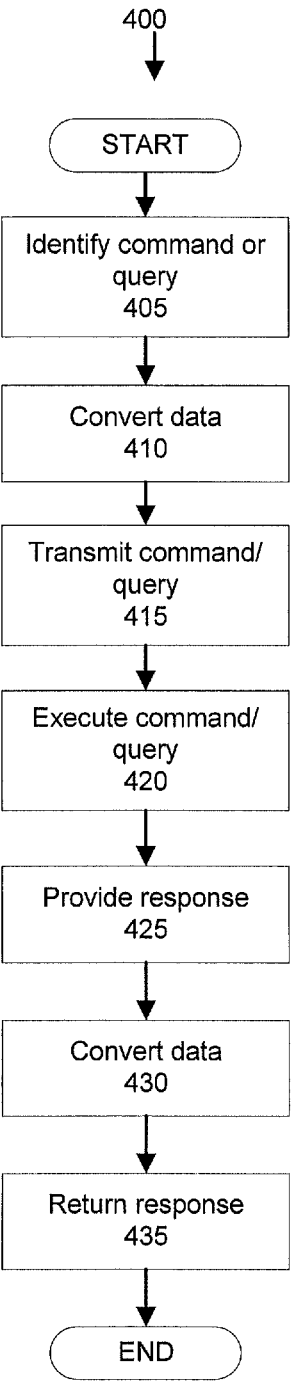
FIG. 4 illustrates an exemplary process for executing, and returning results from, commands or queries to media storage unit.

FIG. 4 illustrates an exemplary process 400 for executing, and returning results from, commands or queries to media storage unit 111.

Process 400 begins in a step 405, when IVR server 146 identifies a command or query to be sent to a particular media storage unit 111. For example, a user of telephone 139 may have been identified with a particular media storage unit 111 as discussed above with respect to step 210 of process 200. As also discussed above, e.g. with respect to steps 325 and 330 of process 300, the user may specify a command or query for the media storage unit 111. For example, the user may specify a command to delete a program, or may issue a query concerning what programs are scheduled to be recorded. Once the user has specified in such command or query, the command or query may be identified by IVR server 146, e.g., the user's speech may be parsed by speech recognition service 141, and a spoken command or query matched to a grammar as described above.

Next, in step 410, data conversion service 144 converts the command or query to a format, e.g., an XML format or a binary format, for transmission to media device 110.

Next, in step 415, IVR server 146 sends the command or query, in the format to which it was converted in step 410, to media device 110, e.g., via a packet network 125.

Next, in step 420, module 105 in media device 110 executes the command or query on media storage unit 111. For example, module 105, after interpreting the command or query, could execute instructions to cause media storage unit 111 to delete a program or programs, to modify a schedule of programs to be recorded, to return a list of programs scheduled to be recorded, etc.

Next, in step 425, module 105 receives a result or results of the command or query executed in step 420, e.g., an indication that the command was successfully executed, or that the command was not successfully executed, or receives results such as a list of programs scheduled to be recorded, etc. Module 105 then provides the result or results to IVR server 146, e.g., via packet network 125.

Next, in step 430, data conversion service 144 on IVR server 146 converts the results or results of the command or query received in step 425 to a format usable by script generator 142 and/or notification service 145. For example, the result or results of the command or query may be included in an audio file referenced in a script, e.g., a VXML script. Similarly, the result or results may be provided in a notification transmitted by notification service 145, as described above.

Following step 430, in step 435, the result or results of the command or query received in step 425 are provided to a user in one or more ways, e.g., via notification service 145 or by audio provided to a user of telephone 139.

Following step 435, process 400 ends.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

APPENDIX

EXEMPLARY VXML

```
<?xml version="1.0" encoding="UTF-8"?>
<!DOCTYPE vxml PUBLIC "-//W3C//DTD VOICEXML 2.1//EN"
"http://www.w3.org/TR/voicexm121/vxml.dtd">
<vxml version="2.0" xmlns="http://www.w3.org/2001/vxml"
    xmlns:xsi="http://www.w3.org/2001/XMLSchema-instance"
    xsi:schemaLocation="http://www.w3.org/2001/vxml
http://www.w3.org/TR/voicexm120/vxml.xsd">
<var name="iMaxErrors" expr="0"/>
<var name="help_count_confirm_caller_type" expr="0"/>
<var name="iMaxErrorsConfirmCallerType" expr="0"/>
<var name="help_count _confirm_memberid" expr="0"/>
<var name="iMaxErrorsConfirmMemberId" expr="0"/>
<var name="iMaxErrorsConfirmInquiryType" expr="0"/>
<var name="help_count_confirm_inquirytype" expr="0"/>
<var name="callerTypeUtterance" expr=" ' ' "/>
<var name="memberIdUtterance" expr=" ' ' "/>
<var name="inquiryTypeUtterance" expr=" ' ' "/>
<var name="returnCode"/>
<var name="chi"/>
<var name="dtmf"/>
<script>
    <![CDATA[
    var promptPath = " ";
var VZ_Entry_Greeting1 = {"tts": "Thank you for calling
Verizon DVR planning, Tell me what are you calling about For
example you can say how much recording time left, change
program time", "wav":promptPath + "VZ_Entry_Greeting1.wav"};
    var VZ_DNIS = {"tts": "DNIS   DNIS ", "wav":promptPath +
"VZ_DNIS.wav"};
    var VZ_DidntHearAnything = {"tts": "I m sorry I didn t
hear anything ", "wav":promptPath +
"VZ_DidntHearAnything.wav"};
    var VZ_WhichType = {"tts": "Please tell me Are you a
member or a provider ", "wav":promptPath +
"VZ_WhichType.wav};
    var VZ_StillDidntHearAnything = {"tts": "I m sorry I still
still didn t hear anything ", "wav":promptPath +
"VZ_StillDidntHearAnything.wav"};
```

APPENDIX-continued

EXEMPLARY VXML

```
    var VZ_DidntGetThat = {"tts": "I m sorry I didn t get
that ", "wav":promptPath + "VZ_DidntGetThat.wav"};
    var VZ_StillDidntGetThat = {"tts": "I still didn t get
that ", "wav":promptPath + "VZ_StillDidntGetThat.wav"];
    var VZ_CallerType_Help1 = {"tts": "You can say member or
provider ", "wav":promptPath + "VZ_CallerType_Help1.wav"};
    var VZ_CallerType_Help2 = {"tts": "Now what type of
caller are you ", "wav":promptPath +
"VZ_CallerType_Help2.wav"};
    var VZ_IThinkYouSaid = {"tts": "I think you said ",
"wav":promptPath + "VZ_IThinkYouSaid.wav"};
    var VZ_IsThatRight = {"tts": "Is that right ",
"wav":promptPath + "VZ_IsThatRight.wav"};
    var VZ_PleaseSayYesOrNo = {"tts": "Please say yes if
what I heard is correct or say no if it s wrong ",
"wav":promptPath + "VZ_PleaseSayYesOrNo.wav"};
    var VZ_HeresWhatIheard = {"tts": "Here s what I heard ",
"wav":promptPath + "VZ_HeresWhatIheard.wav"};
    var VZ_hereswhatiheard = {"tts": "Here s what I heard ",
"wav":promptPath + "VZ_hereswhatiheard.wav"};
    var VZ_InquiryType_Initial = {"tts": "What type of
information are you calling for You can say change
recording, how much time left", "wav":promptPath +
"VZ_InquiryType_Initial.wav"};
    var VZ_InquiryType = {"tts": "Please tell me What type of
information are you calling for ", "wav":promptPath +
"VZ_InquiryType.wav"};
    var VZ_Exit_Provider_Post = {"tts": "please hold while we
transfer your call ", "wav":promptPath +
"VZ_Exit_Provider_Post.wav"};
var VZ_Exit_Agent = {"tts": "Please hold for our next
available representative ", "wav":promptPath +
"VZ_Exit_Agent.wav"};
    var VZ_Exit_MaxError = {"tts": "I m sorry we re having so
much trouble Thank you for calling Verizon DVR planning ",
"wav":promptPath + "VZ_Exit_MaxError.wav"};
    ]] >
</script>
<form id="entry"
    <var name="iMaxErrors" expr="0"/>
    <block>
        <prompt cond="">
            <audio expr="VZ_Entry_Greeting1.wav"
                <value expr="VZ_Entry_Greeting1.tts"/>
            </audio>
        </prompt>
    </block>
    <field name="callType">
        <grammar type="application/srgs+xml" root="MP"
version="1.0">
            <rule id="MP" scope="public">
                <one-of>
                    <item>recording time
left<tag>MEANING='recotimeleft'; </tag></item>
                    <item>time left<tag>MEANING='recotimeleft';
</tag></item>
                    <item>what are my
choice<tag>MEANING='choices'; </tag></item>
                    <item>choices<tag>MEANING='choices';
</tag></item>
                    <item>search for a
program<tag>MEANING='program'; </tag></item>
                    <item>I want to change a
program<tag>MEANING='program'; </tag></item>
                    <item>search for a show<tag>MEANING='show';
</tag></item>
                    <item>show<tag>MEANING='show'; </tag></item>
                </one-of>
            </rule>
        </grammar>
        <noinput count="1">
            <assign name="iMaxErrors" expr="iMaxErrors + 1"/>
            <if cond="iMaxErrors == 3">
                <throw event="maxTries"/>
            </if>
            <audio expr="VZ_DidntHearAnything.wav"
                <value expr="VZ_DidntHearAnything.tts"/>
            </audio>
```

APPENDIX-continued

EXEMPLARY VXML

```
        </noinput>
        <noinput count="2">
            <assign name="iMaxErrors" expr="iMaxErrors + 1"/>
            <if cond="iMaxErrors == 3">
                <throw event="maxTries"/>
            </if>
                <audio expr="VZ_StillDidntHearAnything.wav">
                        <value
expr="VZ_StillDidntHearAnything.ttxs"/>
                </audio>
        </noinput>
        <nomatch count="1">
            <assign name="iMaxErrors" expr="iMaxErrors + 1"/>
            <if cond="iMaxErrors == 3">
                <throw event="maxTries"/>
            </if>
                <audio expr="VZ_DidntGetThat.wav">
                        <value expr="VZ_DidntGetThat.tts"/>
                </audio>
        </nomatch>
        <nomatch count="2">
            <assign name="iMaxErrors" expr="iMaxErrors + 1"/>
            <if cond="iMaxErrors == 3" >
                <throw event="maxTries"/>
            </if>
                <audio expr="VZ_StillDidntGetThat.wav">
                        <value expr="VZ_StillDidntGetThat.tts"/>
                </audio>
        </nomatch>
        <help>
            <assign name="help_count" expr="help_count + 1"/>
            <if cond="help_count > 2">
                <assign name="status" expr="help.status"/>
                <assign name="tntcodename"
expr="help.tntcodename_operator"/>
                <goto
expr="baseUrl+' &command=processdata&&status=
'+status+'&
&tntcodename' + tntcodename +
'&pcreason=toomanyhelp' "/>
                <else/>
                    <audio expr="VZ_InquiryType_Initial.wav">
                        <value
expr="VZ_InquiryType_Initial.tts"/>
                    </audio>
            </if>
        </help>
        <catch event="maxTries">
            <clear namelist="entry"/>
            <goto next="#entry"/>
        </catch>
        <filled>
            <if cond="callType.MEANING == 'recotimeleft' ">
                <goto next="#recotimeleft"/>
            <elseif cond="callType.MEANING == 'choices' "/>
                <goto next="#choices"/>
            <elseif cond="callType.MEANING == ' program'"/>
                <goto next="#program"/>
            <elseif cond="callType.MEANING == ' show '"/>
                <goto next="#show"/>
            <else/>
                <goto next="#agent"/>
            </if>
        </filled>
    </field>
</form>
<form id="recotimeleft">
    <block>
        <prompt version="1.0">
            Recording time left on your DVR is 7 hours and 25
minutes
        </prompt>
        <goto next="#entry"/>
    </block>
</form>
<form id="choices">
    <block>
        <prompt version="1.0">
```

APPENDIX-continued

EXEMPLARY VXML

```
            You can say recording time left, give me my programs
        </prompt>
        <goto next="#entry"/>
    </block>
</form>
<form id="program">
    <block>
        <prompt version="1.0">
            Give me the name of program you would like to change
        </prompt>
        <goto next="#entry"/>
    </block>
</form>
<form id="show">
    <block>
        <prompt version="1.0">
            The shows you have recorded are
        </prompt>
        <goto next="#entry"/>
    </block>
</form>
<form id="agent">
    <block>
        <prompt version="1.0">
            Please hold while I connect to an agent
        </prompt>
        <goto next="#goToAgent"/>
    </block>
</form>
</vxml>
```

What is claimed is:

1. A method, comprising:
receiving, from a telephony device, a voice telephone call in a server configured to provide interactive voice response and establish a connection with the telephony device;
generating a script that includes a menu of spoken commands based on data elements in the script;
receiving a spoken command from the telephony device over the connection after generating the script, the spoken command being one of the spoken commands included in the menu;
converting, in the server, the spoken command to a format for a media storage unit to produce a converted command; and
sending the converted command to the media storage unit.

2. The method of claim 1, wherein the menu of spoken commands is provided to the telephony device according to the script.

3. The method of claim 1, wherein the script is formatted according to voice extensible markup language (VXML) format.

4. The method of claim 1, further comprising:
receiving, from the media storage unit, one or more pieces of data responsive to the command;
converting the data from a format provided by the media storage unit to a format that the server is configured to interpret to provide information to the telephony device; and
providing at least some of the data to the telephony device.

5. The method of claim 1, further comprising:
receiving, from the media storage unit, one or more pieces of data responsive to the command;
converting the data from a format provided by the media storage unit to a format that the server is configured to interpret to provide information to the telephony device; and providing a notification relating to at least some of the data via at least one of e-mail and a text message.

6. The method of claim 5, wherein the notification is provided to a user via at least one of the e-mail and the text message and indicates that the spoken command was completed.

7. The method of claim 1, wherein the converted command sent to the media storage unit is a query for information from the media storage unit.

8. The method of claim 1, wherein the converted command sent to the media storage unit includes at least one of a command to delete a program, a command to record a program, a command to list programs scheduled to be recorded, and a command to list programs available to be viewed.

9. The method of claim 1, further comprising providing, to the telephony device, the menu of spoken commands related to a remote media storage unit.

10. The method of claim 1, wherein the media storage unit is a digital video recorder.

11. The method of claim 1, further comprising:
generating a shell script that includes the data elements, the data elements including data elements that are playable by the server over the connection to the telephony device; and
populating the shell script with a grammar implementation to generate the script.

12. A non-transitory computer-readable medium tangibly embodying computer-executable instructions including instructions for:
receiving, from a telephony device, a voice telephone call in a server configured to provide interactive voice response and establish a connection with the telephony device;
generating a script that includes a menu of spoken commands based on data elements in the script;
receiving a spoken command from the telephony device over the connection after generating the script, the spoken command being one of the spoken commands included in the menu;
converting the spoken command to a format for a media storage unit to produce a converted command; and
sending the converted command to the media storage unit.

13. The medium of claim 12, wherein the menu of spoken commands being provided to the telephony device according to the script.

14. The medium of claim 12, the instructions further comprising instructions for:
receiving, from the media storage unit, one or more pieces of data responsive to the command;
converting the data from a format provided by the media storage unit to a format that a server is configured to interpret to provide information to the telephony device; and
providing at least some of the data to the telephony device.

15. The medium of claim 12, the instructions further comprising instructions for:
receiving, from the media storage unit, one or more pieces of data responsive to the command;
converting the data from a format provided by the media storage unit to a format that a server is configured to interpret to provide information to the telephony device; and providing a notification relating to at least some of the data via at least one of e-mail and a text message.

16. The medium of claim 12, wherein the converted command sent to the media storage unit is a query for information from the media storage unit.

17. The medium of claim 12, wherein the converted command sent to the media storage unit includes at least one of a command to delete a program, a command to record a program, a command to list programs scheduled to be recorded, and a command to list programs available to be viewed.

18. The medium of claim 12, the instructions further comprising instructions for providing, to the telephony device, the menu of spoken commands related to a remote media storage unit.

19. A system, comprising an interactive voice response server configured to:
receive, from a telephony device, a voice telephone call in the interactive voice response server configured to provide interactive voice response and establish a connection with the telephony device;
generate a script that includes a menu of spoken commands based on data elements in the script;
receive a spoken command from the telephony device over the connection, the spoken command being one of the spoken commands included in the menu;
convert the spoken command to a format for a media storage unit to produce a converted command; and
send the converted command to the media storage unit.

20. The system of claim 19, wherein the menu of spoken commands is provided to the telephony device according to the script.

21. The system of claim 19, the interactive voice response server further configured to:
receive, from the media storage unit, one or more pieces of data responsive to the command;
convert the data from a format provided by the media storage unit to a format that the server is configured to interpret to provide information to the telephony device; and
provide at least some of the data to the telephony device.

22. The system of claim 19, the interactive voice response server further configured to:
receive, from the media storage unit, one or more pieces of data responsive to the command;
convert the data from a format provided by the media storage unit to a format that the server is configured to interpret to provide information to the telephony device; and
provide a notification relating to at least some of the data via at least one of e-mail and a text message.

23. The system of claim 19, wherein the converted command sent to the media storage unit is a query for information from the media storage unit.

24. The system of claim 19, wherein the converted command sent to the media storage unit includes at least one of a command to delete a program, a command to record a program, a command to list programs scheduled to be recorded, and a command to list programs available to be viewed.

25. The system of claim 19, the interactive voice response server further configured to provide, to the telephony device, the menu of spoken commands related to a remote media storage unit.

* * * * *